S. M. FRIEDMAN.
VEHICLE WHEEL.
APPLICATION FILED MAY 12, 1909.

970,911.    Patented Sept. 20, 1910.
2 SHEETS—SHEET 1.

WITNESSES
John A Bergstrom
C. W. Fairbanks

INVENTOR
Samuel Morris Friedman
BY
Munn & Co
ATTORNEYS

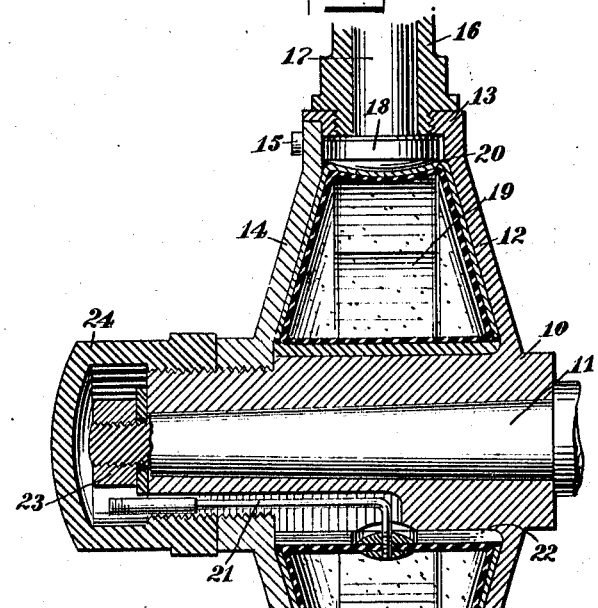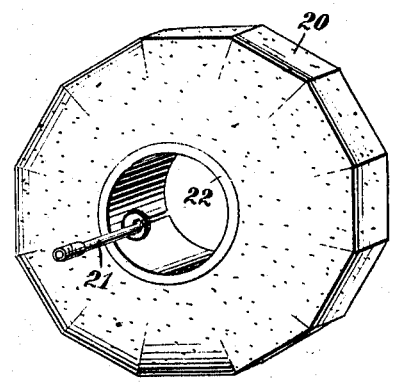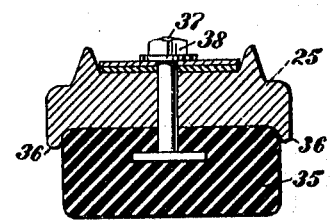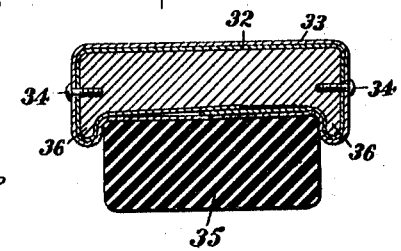

UNITED STATES PATENT OFFICE.

SAMUEL MORRIS FRIEDMAN, OF NEW YORK, N. Y.

VEHICLE-WHEEL.

970,911.  Specification of Letters Patent.  Patented Sept. 20, 1910.

Application filed May 12, 1909. Serial No. 495,547.

*To all whom it may concern:*

Be it known that I, SAMUEL MORRIS FRIEDMAN, a citizen of the United States, and a resident of the city of New York, borough of Brooklyn, in the county of Kings and State of New York, have invented a new and Improved Vehicle-Wheel, of which the following is a full, clear, and exact description.

This invention relates to certain improvements in vehicle wheels, and more particularly to resilient wheels in which the resiliency is gained by an annular air chamber adjacent the hub of the wheel rather than by a peripheral pneumatic tire.

The main object of my invention is to so construct this inner annular air chamber that the air may be retained therein under pressure as efficiently as it can be in an ordinary pneumatic tire. To accomplish this, I provide an annular air cushion or air bag of flexible material, for instance, rubber, and so disposed in relation to the spokes of the wheel that all of said spokes are held outwardly by the pressure within the cushion or air bag.

A further object of my invention is to provide certain improvements in the structure of the rim and its connections with the spokes; whereby the separate sections of the rim may have relative movement.

Other objects and advantages of my improved construction will be set forth hereinafter and the scope of the invention defined in the claims.

Reference is to be had to the accompanying drawings, forming a part of this specification, in which similar characters of reference indicate corresponding parts in all the figures, and in which—

Figure 1:
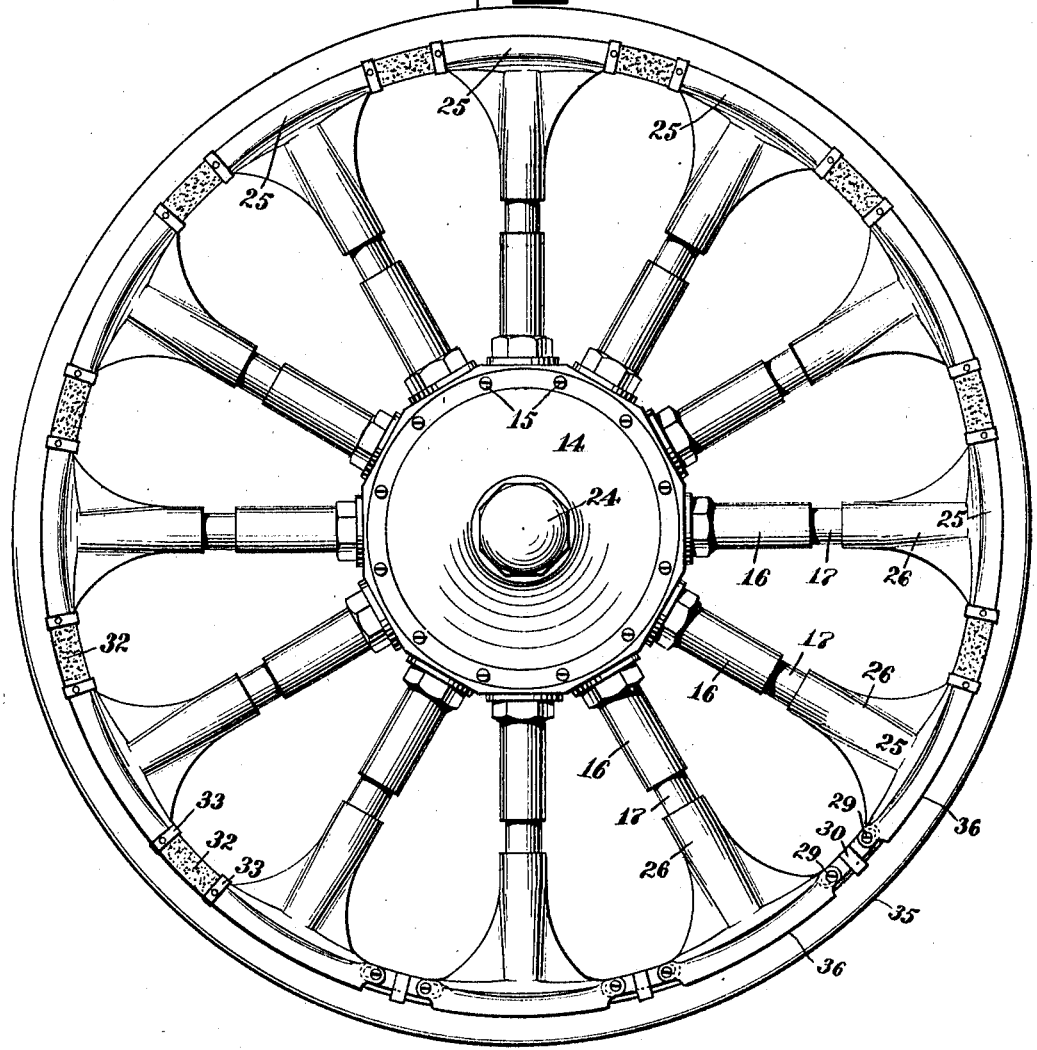
Figure 2:
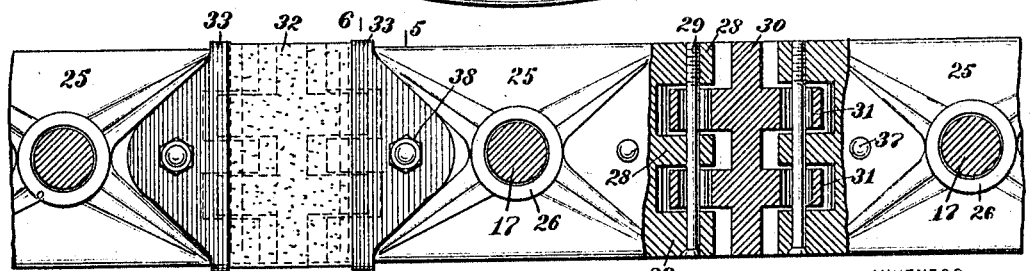

Figure 1 is a side view of a vehicle wheel constructed in accordance with my invention; Fig. 2 is a view of a portion of the rim on an enlarged scale, the spokes being shown in section; Fig. 3 is an axial section in the plane of one of the spokes; Fig. 4 is a perspective view of the air cushion or air bag; and Figs. 5 and 6 are transverse sections on the lines 5—5 and 6—6, respectively, of Fig. 2.

In the specific form illustrated in the accompanying drawings, I provide a hub 10 having a central passage therethrough to receive the spindle 11 of the vehicle axle. Encircling the hub proper is a chamber or compartment formed by an end wall 12 integral with the hub proper, and a peripheral wall 13 supported by the wall 12. The opposite end of the chamber is closed by an end wall 14, threaded on to the outer end of the hub and having its periphery in engagement with the edge of the peripheral wall 13 and secured thereto by suitable screws 15 or other fastening means. The peripheral wall 13 is provided with a plurality of apertures therethrough into which are threaded hollow spoke sections 16, all extending radially outward in the same plane. These spoke sections are rigid with the hub, and each incloses a spoke section 17 longitudinally movable in respect thereto. The inner ends of these spoke sections 17 are provided with enlarged heads 18, which preferably have rounded or curved outer surfaces and fit within countersunk apertures in the inner surface of the peripheral wall 13. Each spoke section 17 at its outer end is connected to the rim of the wheel, as hereinafter set forth.

Within the chamber formed by the hub proper, and the walls 12, 13 and 14, I provide a pneumatic bag or cushion formed of an inner rubber casing 19 and an outer inclosing casing 20, of leather or other similar material. For inflating the cushion, I provide a conduit or tube 21 disposed within a groove in the outer surface of the hub proper and connected to the inner peripheral wall of the bag 19. The outer end of the tube terminates adjacent the outer end of the hub and is provided with a suitable valve for preventing the escape of the compressed air. The inner end of the tube is bent outwardly radially and extends through an aperture or slit in the inner peripheral wall 22 of the leather casing or covering of the rubber bag. This inner peripheral wall or collar 22 may be made separate from the remainder of the bag, so as to permit of its being slipped outwardly longitudinally and to permit the bag to be collapsed and removed from the leather casing. The hub is secured to the spindle 11 in any suitable manner, as, for instance, by a nut 23, and this nut, as well as the outer end of the air tube 21, may be protected by a cap 24, threaded on to the exterior of the hub. The rim is formed of a plurality of sections so connected together as to permit of certain relative movement of the sections. Each alternate section 25 is provided with an inwardly-extending sleeve or boss 26 rigidly secured to the spoke section 17. Said spoke section preferably has a shoulder 27 for abutting against the inner end of this boss or sleeve, so as to insure the proper adjustment of the spoke section in respect to the boss or sleeve. Each rim section 25 terminates in circumferentially-extending lugs or flanges 28, spaced apart and receiving a transversely-extending screw or bolt 29. The intermediate rim sections 30 are unattached to the spokes but are provided with outwardly-extending lugs 31 extending between the lugs 28 of the rim sections 25, and each having a slot therein to receive the corresponding screw or bolt 29. The rim sections 30 not only connect the rim sections 25 but also permit of a relative movement of the latter in respect to each other, due to the slots in the lugs 31. Each rim section is preferably inclosed in a flexible casing or covering 32, which prevents the admission of dust, dirt or other foreign matter to the pivotal connections between the sections. These casings 32 are preferably of thin leather or similar material, and each not only extends longitudinally of its corresponding section 30 to inclose and conceal the latter, but extends over a portion of the adjacent rim section 25. The ends of the casings are secured to the rim sections 25 by sheet metal collars or bands 33 secured to said rim sections in any suitable manner, for instance, by screws 34, as shown in Fig. 6.

Encircling the rim is a solid tire 35 of rubber, secured to each of the rim sections. Each rim section 25 may have outwardly-extending peripheral flanges 36, and the tire may have bolts 37 with their heads embedded in the tire, and extending inward radially through the rim sections 25. At the inner end of each bolt, is a suitable nut 38, which must be removed before the tire can be detached from the rim. These bolts also serve to prevent the tires from slipping. The rim sections 25 and their corresponding spoke sections 17, are movable inwardly upon the application of a load sufficient to overcome the outward pressure of the air cushion. As each rim section is balanced inwardly, the air cushion will be distorted to partially collapse the same and further compress the air. The spoke sections have heads sufficiently large, so that there is no danger of puncturing the air cushion, and the leather covering of the rubber bag prevents the edges of the head from cutting into the rubber. The rubber bag prevents the escape of the air in a far more efficient manner than does the packing around the spoke sections were the cushion omitted and the air compressed directly in the chamber.

Having thus described my invention, I claim as new and desire to secure by Letters Patent:

1. A vehicle wheel having a plurality of spoke sections, a rim formed of a plurality of separate sections pivotally connected together, certain of said sections being rigidly secured to said spoke sections, and the remainder of said rim sections being independent of the spoke sections, and flexible casings inclosing said last-mentioned rim sections, and an annular tire carried by said rim and having a plurality of bolts embedded therein and extending through certain of said rim sections.

2. A vehicle wheel having a hub, including a bearing sleeve and an annular chamber or casing carried thereby, a plurality of spoke sections secured about the periphery of said chamber or casing, a plurality of spoke sections telescopically mounted within the first-mentioned spoke sections and each having a head upon its inner end and presenting a convex surface within said annular chamber, said heads being normally countersunk within the peripheral wall of the chamber, an annular pneumatic cushion or bag disposed within said chamber or casing and removable therefrom and having its outer peripheral wall polygonal in cross section, the number of faces upon said peripheral wall corresponding to the number of telescoping spoke sections, each face of said wall being in engagement with the convex surface of the corresponding spoke section.

In testimony whereof I have signed my name to this specification in the presence of two subscribing witnesses.

SAMUEL MORRIS FRIEDMAN.

Witnesses:
 NATHAN STEMPLE,
 M. F. MANSFIELD.